United States Patent [19]

Smith

[11] Patent Number: 4,991,509
[45] Date of Patent: Feb. 12, 1991

[54] OPTICAL PROXIMITY DETECTOR

[75] Inventor: Paul J. Smith, Silver Spring, Md.

[73] Assignee: The United States of America as represented by the Secretary of the Navy, Washington, D.C.

[21] Appl. No.: 507,441

[22] Filed: Jun. 24, 1983

[51] Int. Cl.$^5$ .............................................. F42C 13/02
[52] U.S. Cl. ................................................. 102/213
[58] Field of Search ..................................... 102/213

[56] References Cited

U.S. PATENT DOCUMENTS

| | | | |
|---|---|---|---|
| 2,060,199 | 11/1936 | Hammond, Jr. ..................... | 102/213 |
| 2,060,205 | 11/1936 | Hammond, Jr. ..................... | 102/213 |
| 2,255,245 | 9/1941 | Ferrel ................................... | 102/213 |
| 3,554,129 | 1/1971 | Alpers ................................... | 102/213 |

FOREIGN PATENT DOCUMENTS 2458823 2/1981 France ............................... 102/213

Primary Examiner—Charles T. Jordan
Attorney, Agent, or Firm—Kenneth E. Walden

[57] ABSTRACT

Method and apparatus for optically detecting an object within close proximity to a structure surface, e.g., the nose of a torpedo or claw of a robotic arm, and generating a responsive control or command signal. A cone of light is emitted from the structure surface to illuminate any object coming within its field. Light reflected from that object to a receiver is processed to generate a responsive first electrical signal. This first signal is further processed to generate a second signal, control or a command signal, only after the first signal has decreased to around 30% of its peak level indicating that the object has closed to within a predetermined distance to the structure surface.

11 Claims, 4 Drawing Sheets

OPTICAL PROXIMITY DETECTOR

BACKGROUND OF THE INVENTION

Proximity detection has been accomplished by use of magnetics, acoustics, optical and other forms of electromagnetic radiation. All active systems generate a signal which is transmitted toward an object from which it is reflected, though diminished, to the sender, where it is processed to determine the distance to the target by the time it takes for the signal to make the round trip.

Proximity detection by detecting a magnetic field has long been used and its limitations are well understood.

Acoustics have long been used for proximity detection in water. An acoustic signal is generated and directed into water toward the intended or suspected target from which it is reflected. One of the disadvantages of the acoustic system is that the acoustic signal is not easily directionally controlled and tends to scatter once released. This tends to notify a second listener of the position of the sender. Furthermore the speed of sound in air and water is relatively slow, a fact which may eliminate it from some uses where time and speed are factors, particularly in high speed operations.

One of the advantages of using light for proximity detection is that its transmission rate is approximately one million times faster than that of sound. Furthermore, it can be directed in a narrow pattern to yield high resolution and does not scatter to dissipate itself and generally announce itself. Several light beams can be directed on a target as they do not mix or interfere with one another when they cross or are otherwise brought together. In the past, it has been proposed to merely direct a beam of light on an object and measure the light reflected from its surface to provide detection. The round trip time for the light to reach the object and return is difficult to measure, since light travel 186,000 miles/second. Thus peak detection is usually used. However, this approach has some disadvantages. The contour, color, or surface texture of the object surface are unknown factors which affect light reflection. With known systems, there is no way of determining whether the magnitude of the reflected light is caused by surface condition or proximity of the object. Furthermore there are no known means of determining when the maximum return signal has been reached. Therefore, a command signal is provided upon the reflected signal reaching some predetermined threshold.

Glass optical systems tend to be large, delicate, expensive, and unsuitable for practical use in normal environments. Optical fibers, on the other hand, overcome many of the problems associated with bulky optics. They are rugged and can be used for beam forming to avoid delicate beam forming problems associated with bulk objects. Optical fibers allow substantial freedom in the location of light sources and receivers.

SUMMARY OF THE INVENTION

The invention relates to an optical proximity detector. While the invention has general utility, for the purpose of disclosing it adequately in the manner in which it functions, it will be described herein with (1) a robot gripper for detecting objects to be approached and handled and (2) on a torpedo for detecting an underwater object closing in proximity with the nose of the torpedo, but prior to actual contact, to provide a signal to detonate and on-board explosive warhead.

With a torpedo, one group of optical fibers are provided with light, such as from a laser diode, and have their ends terminated in a forward looking array in the nose surface of a torpedo for illuminating a cone field ahead of the torpedo. Another group of optical fibers also have their ends arranged in a forward looking array in the nose of the torpedo to receive light along a cone of acceptance as it is reflected from any object coming within the illuminated cone field. Light received by the ends of the second group of the optical fibers is transported to a photodetector and electronically process to provide a first electrical signal. This first electrical signal is further electronically process to provide a second electrical signal which defines a control or command signal for firing an explosive warhead on-board the torpedo, but only after the first electrical signal has decreased to around 30% of its peak value, thus assuring close proximity of the object.

With a robotic gripper, light emitting optical fiber ends and light receiving optical fiber ends are provided on the surface of the gripper to look optically forward to detect an object being approach within a cone of illumination to signal the gripping control mechanism. Again, light emitted by one or more optical fiber ends located in the gripper jaws is reflected by any object in close proximity to one or more light receiving fiber ends and transmitted to a detector and there processed to produce an electronical signal to control the robotic arm.

The optical fiber light emitting and receiving arrangements have many uses for providing signal to control equipment, the above being only two examples.

Therefore, it is an object of this invention to provide an optical proximity detector to detect an approaching or approached object prior to actual contact.

It is another object of the invention to provide an optical proximity detector employing optical fibers for sending light to illuminate an object and receiving light reflected from that object and further processing it to provide a control or command electrical signal.

It is still another object of the invention to provide an optical detector for use in detecting close proximity of an object from a structure surface such as a torpedo nose or robotic arm claw.

It is a further object of the invention to provide a method of detecting close proximity of an underwater object closing with a torpedo nose by transmitting light forward of the torpedo to refect it from the object and receiving the reflected light and converting it to electrical signal and processing that signal to fire a warhead on-board the torpedo only after the maximum signal is pass thereby assuring close proximity.

Other objects of the invention will become apparent to one skilled in the art after reading the specification in conjunction with the following drawings.

DETAILED DESCRIPTION OF THE INVENTION

Figure 1:
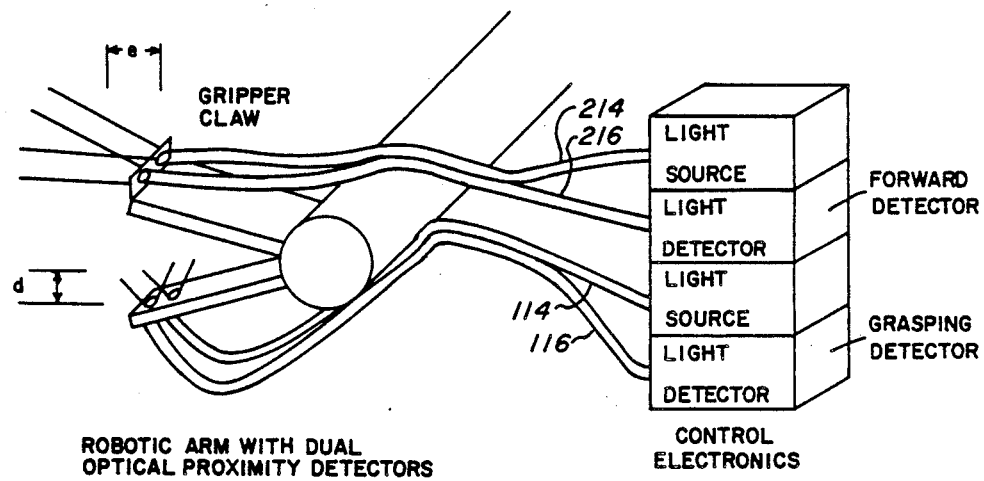
FIG. 1 is a perspective view of an arrangement illustrating the invention applied to a robotic claw gripper.
Figure 2:
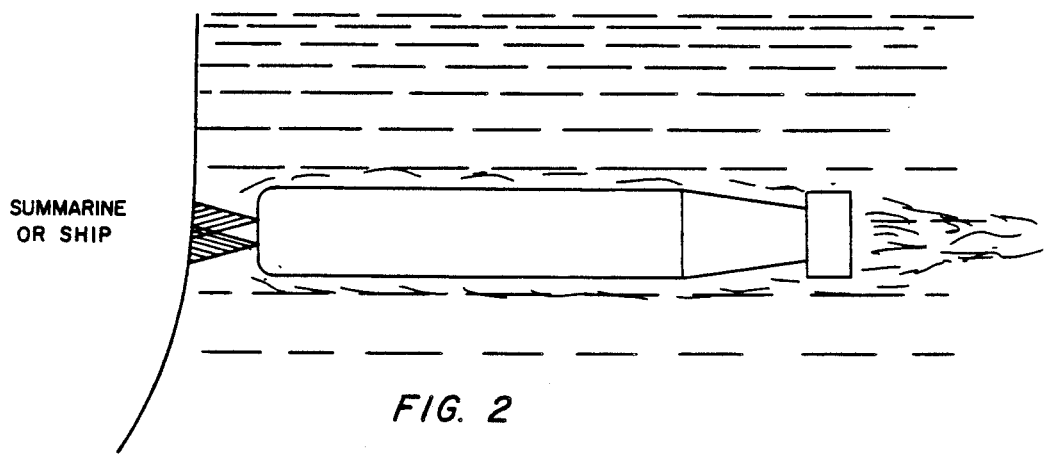
FIG. 2 shows a torpedo approaching an underwater structure in close proximity.

Refer now to the drawings for a more detailed presentation of the invention. There is shown in FIG. 1 a schematic illustration of a pair of optical proximity detectors applied to the gripper claw a robotic arm In FIG. 2 the optical proximity detector is applied to the nose of a torpedo shown approaching the hull of a submarine or ship.

While the invention has numerous applications for detecting objects approaching to within close proximity to a structure surface, detailed description will be made herein concerning its use on a torpedo nose. Accordingly, in FIG. 4, the invention is disclosed within a setting of a torpedo, identify generally by numeral 10, having a nose structure with a flat frontal surface 12. A pair of optical fibers 14 and 16 have respective ends 18 and 20 terminating substantially flush with the frontal surface and facing in a parallel forward direction. Light source 22, such as light emitting diode, incandescent bulb or a laser diode, is coupled into the other end of optical fiber 14. Its light, once launched into the optical fiber, is transported along the optical fiber until it reaches end 18 where it exits in the form of cone 24 to illuminate the surface of any object (target) which may come within its field of view. The exit angle of the light cone is known as the numerical aperture (NA), or cone of acceptance, and its magnitude depends upon several factors. These include the index of refraction of the optical fiber core ($N_1$), core cladding ($N_2$) and the medium ($N_0$) into which the light exits. The angle of the exit cone is equal to 2 arcsine $NA/N_0$. Where $N_1^2 - N_2^2$ is define as the numerical aperture. In air ($N_0 = 1$) and the equation for the exit cone angle reduces to 2 arcsine NA). By choosing the type of optical fiber, the exit cone angle can be controlled.

Figure 4:
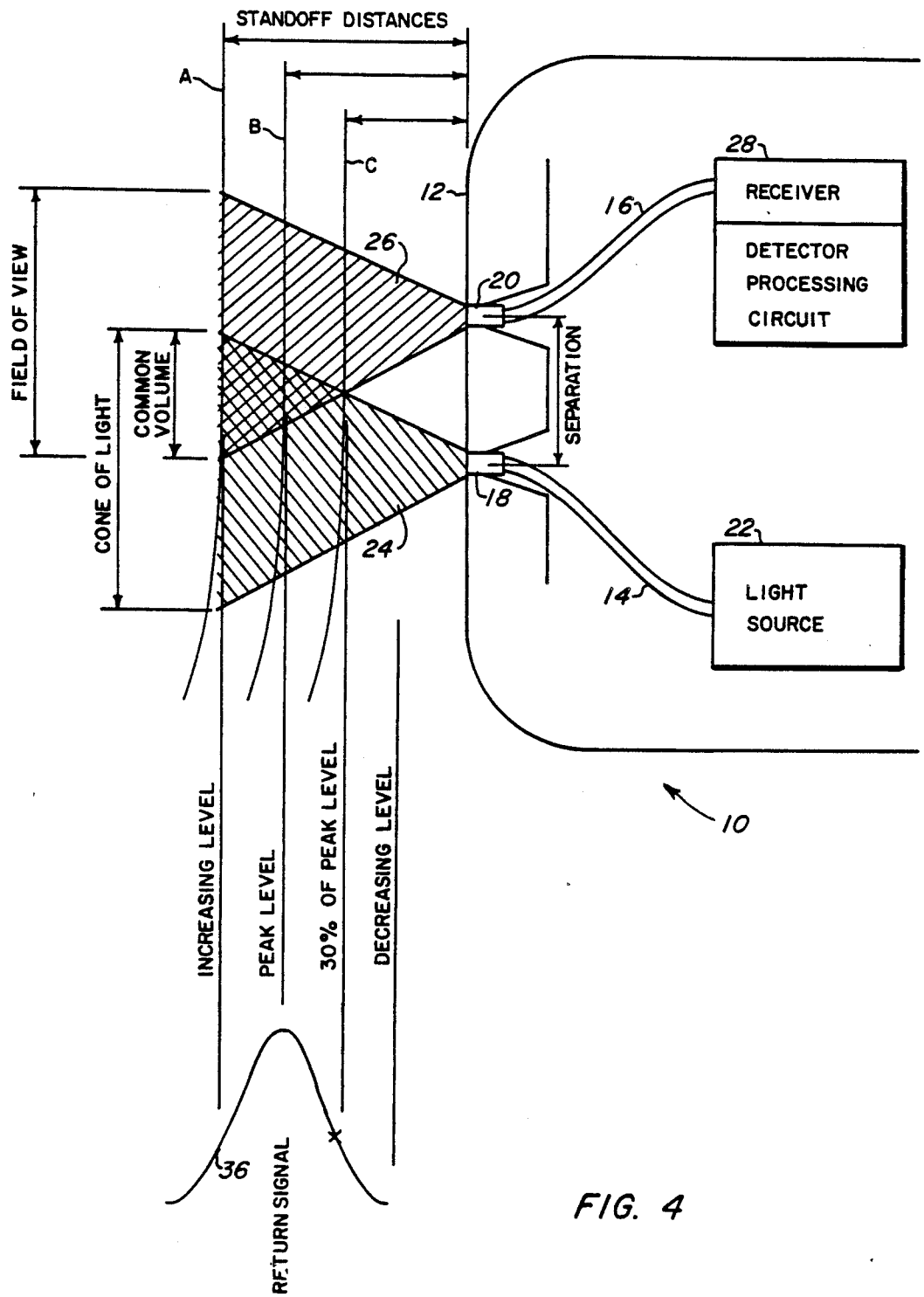
FIG. 4 illustrates the invention applied to the nose of a torpedo.
Figure 5:
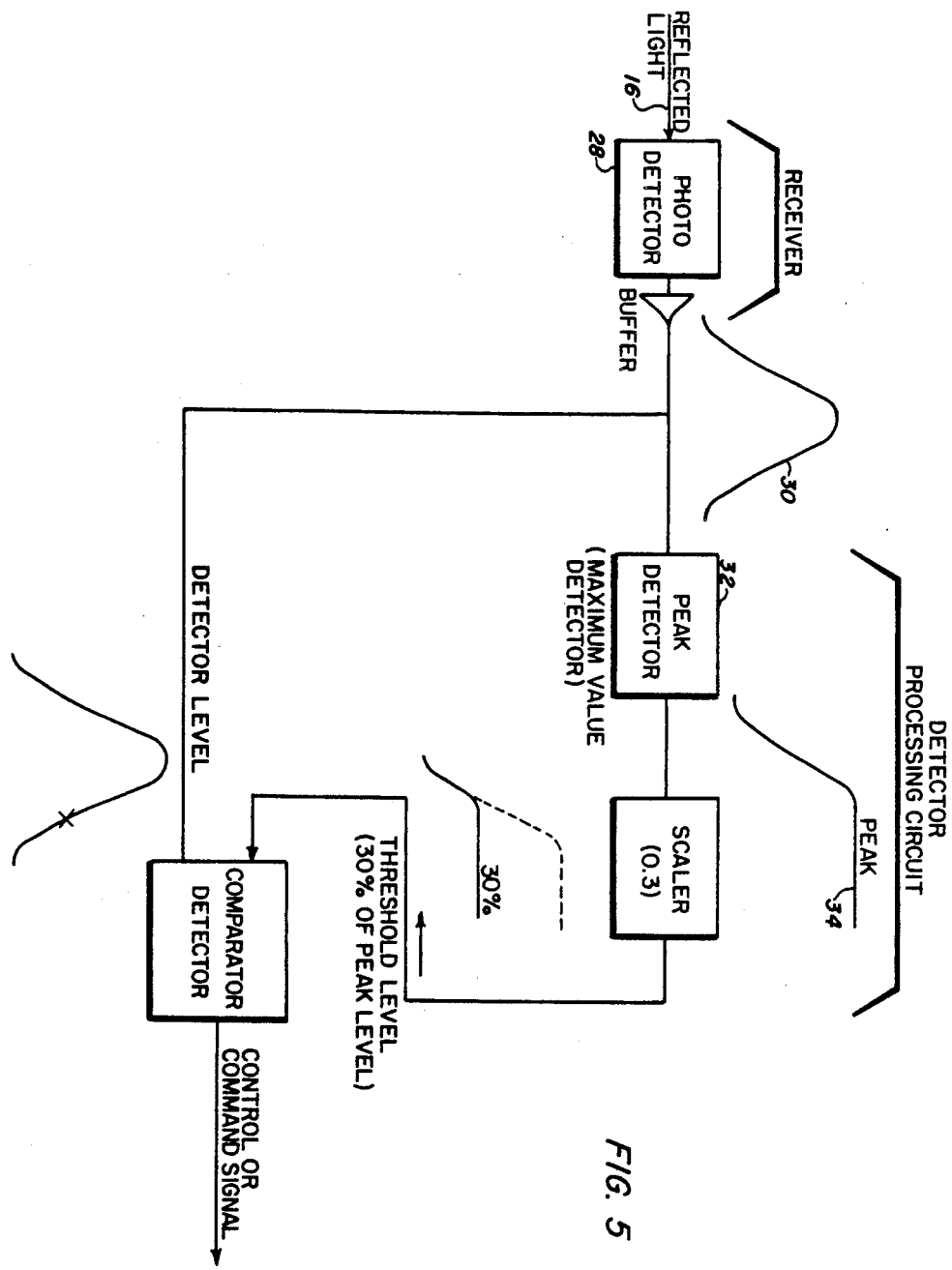
FIG. 5 is a schematic arrangement of the light receiving and electrical processing circuit.

Light emitted from end 18 of optical fiber 14 (transmitting) traverses the medium (water) in front of it to illuminate a target, the surface of which is illustrated at standoff distances A, B, and C in FIG. 4. Light striking the target in any of these positions, or ones intermediate thereof, is reflected back in many directions, including to input end 20 of receiving optical fiber 16. Light striking fiber end 20 (within its cone of acceptance or field of view 26, 2 arcsine NA) is transported along receiving optical fiber 16 to receiver 28 (photodetector) located at its other end. Reference should now be made to FIG. 5 for description of the electronic processing circuit. Photodetector 28 (photo diode) converts the light into an electrical signal which is buffered (amplified) to provide a first electrical signal 30. This first electrical signal is then processed by the detector processing circuit illustrated diagramatically in FIG. 5 Buffered signal 30 is applied to a peak detector 32 which provides signal 34. The output of the peak detector is multiplied by 0.3 at the scaler and then compared to buffer signal 30. When signal 30 has decreased to 30% of the value of peak detector 34 a second signal is generated to indicate detection of a target and provide a control or command signal to fire an explosive charge (not illustrated) within the torpedo.

As will be appreciated from a study of the illustration in FIG. 4, the standoff distances at which the disclosed apparatus can detect a target (e.g., A, B, or C) varies in accordance with the lateral separation distance between optical fiber ends 18 and 20. The closer the optical fiber ends are to each other, for example, the closer to the torpedo nose structure surface the field of "common volume" commences. The greater the separation distance the further out the cone of common volume commences. Another factor controlling commencement of the field of common volume and standoff distance at which the detecting apparatus is effective is the numerical aperture (NA) of the optical fiber ends. This defines the angle of emitted cone of light from end 18 and the cone of acceptance defining the field of view of receiving optical fiber end 20.

It will be appreciated that light (both emitted and reflected) is dissipated in passing through water forward of the torpedo nose surface 12. Therefore, there is a practical limit to the standoff distance at which the invention arrangement is effective. With the arrangement illustrated in FIG. 4, the practical standoff distance from the torpedo nose at which an explosive carried by the torpedo can be initiated is from a fraction of an inch to several inches.

Figure 6:
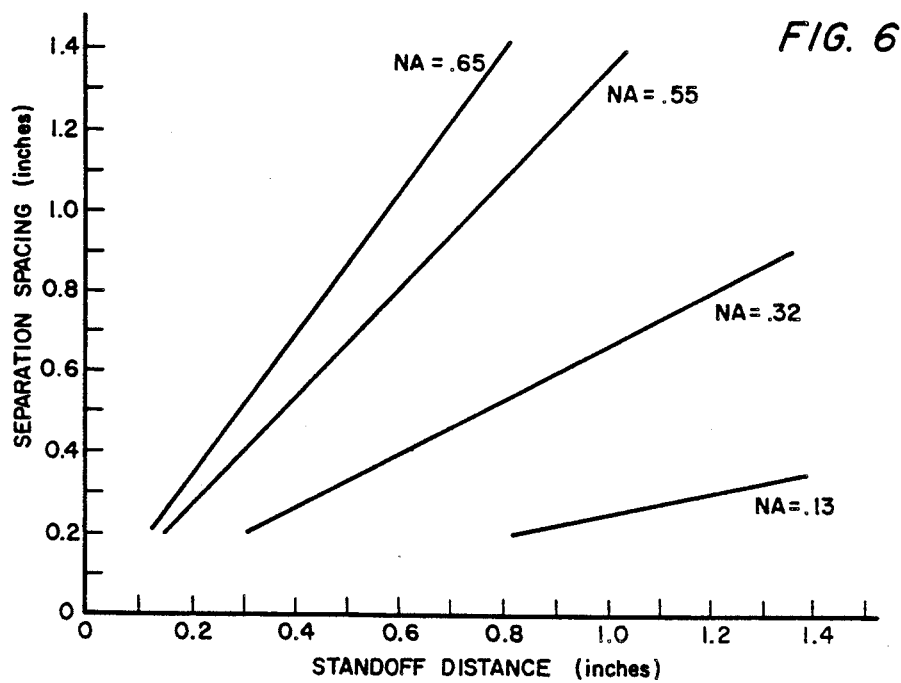
FIG. 6 illustrates in graph form calculated predictions of standoff distances for the optical proximity detector versus numerical apertures (NA) and separation spacing between sending and receiving optical fiber ends.
Figure 7:
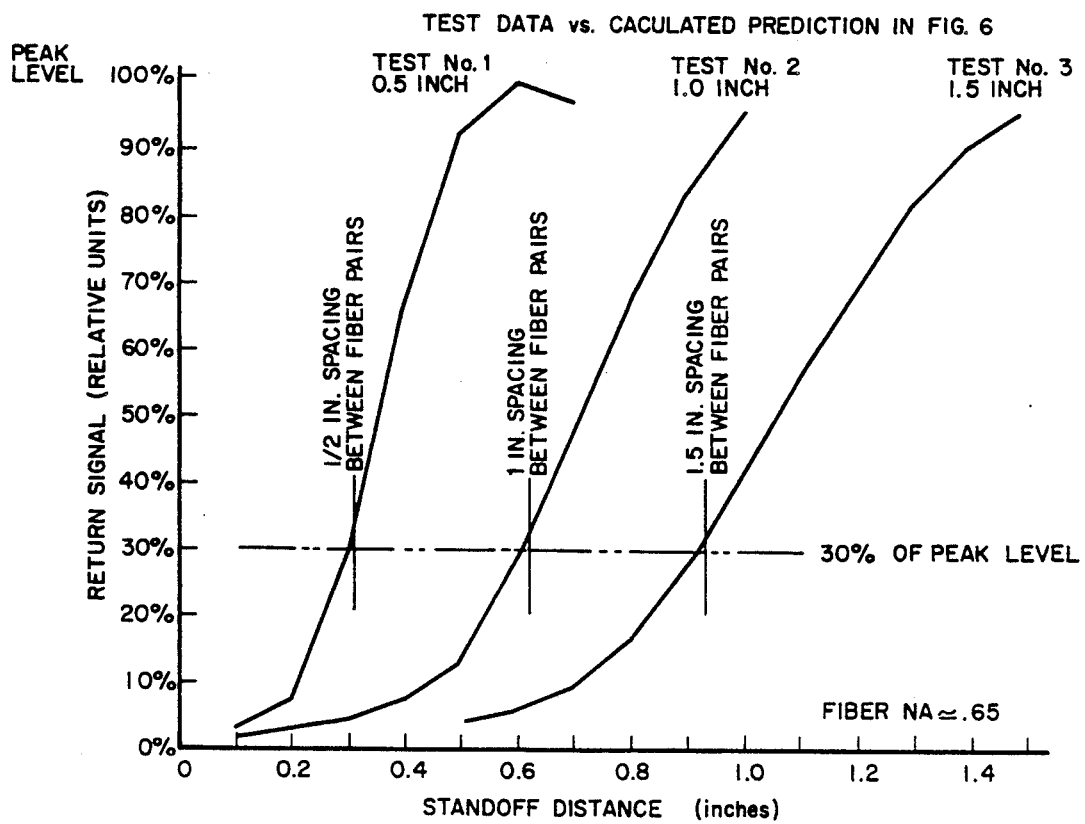
FIG. 7 is actual test results in graph form illustrating the magnitude of the return (reflecting) signal for a fiber having a numerical aperture equal 0.65 at three different standoff distances.

FIG. 6 shows the relationship between the standoff distance and the separation spacing between transmitter optical fiber end 18 and receiving optical fiber end 20 for four different optical fibers having numerical aperatures ranging from 0.13 to 0.65. FIG. 7 illustrates the results of a series of test. The standoff distances are shown at the 30% level. In test #1, the transmitting and receiving optical fiber ends 18 and 20 were 0.5 inches apart. For test #2 the separation was 1.0 inches, and for test #3 the separation was 1.5 inches. The returned signal (normalized) was plotted. In each test, the signal level was approximately 30% of its peak value at the calculated standoff distance.

Referring once again to FIG. 4, it will be noted that the cone of emitted light 24 and the field of view defined by the cone of acceptance 26 overlap to provide a common volume commencing a short distance in front of the torpedo nose structure surface. It is within the field of this common volume that an illuminated object's reflected light will be accepted by optical fiber end 20. Three standoff distances (A, B, or C) are illustrated in this field of common volume. Further out than standoff distance A, so much light is absorbed by the medium (water) that no reflected light is indicated. However, for an object or target coming within standoff distance A there is produced an increasing level of reflected light as indicated by signal curve 36. While more of the target surface reflects light when the target is farther out much light is dissipate in transmission in both out and return legs which may range up to several inches. As the standoff distance closes from position A, the magnitude of reflected light increases rapidly as indicated by the rising portion of curve 36. At target standoff distance B the light reflected to optical fiber end 20 is at its peak level. As the target standoff distance closes still further, the level of light reflected rapidly decreases, and at standoff distance C (where the field of common volume commences), reflected light is at around 30% of the peak level at standoff distance B. As the target closes still further with the torpedo nose surface, the reflected light drops off still further.

Reflective optical signal 36 is, as mentioned with reference to FIG. 5, transported to photodetector 28 and converted to a first electrical output signal 30. The standoff distance at which maximum output signal and maximum first electrical signal are generated can be controlled either by (1) separation distance between optical fiber ends 18 and 20 or (2) cones of acceptance of the optical fibers. By controlling the separation distance and the distance at which the electrical output signal has decreases to around 30% of its peak level from which a second or control signal is generated, the initiation of an explosive charge on-board the torpedo can be controlled to occur when the torpedo nose is within a fraction of an inch of its target.

The precise control is superior to any method which relies only on the initial receipt of reflected light from a target surface at a predetermined magnitude. There are numerous factors, such as target shape, size, color, or surface covering, which effects the magnitude of the reflected light to make for imprecise explosion timing. With the present invention, a control signal is generated and sent to initiate the explosive charge only after the standoff distance is at a distance closer than where a maximum output signal is return. The distance forward of the torpedo nose where the maximum output signal is return is designed into the arrangement by the separation between the optical fibers and the numerical apertures of the optical fiber ends.

Since the speed of light is so fast, optical signals can be sent, received and processed to provide a command electrical signal to fire an explosive aboard the torpedo while the torpedo has closed on the target only by a fraction of an inch.

Figure 3A:
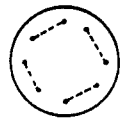
FIGS. 3a through 3c are nose views of a torpedo illustrating various arrays of pairs of light transmitting and receiving optical fiber ends.
Figure 3B:
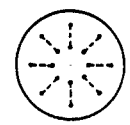
Figure 3C:
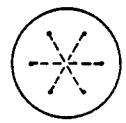

An arrangement has been disclosed with respect to a pair of optical fibers, one emitting light and the other receiving reflected light in association with electronic processing to provide a control signal. The optical fibers operate in pairs. In practice, a plurality of pairs of optical fibers would be employed, disposed in an array about the nose of a torpedo. A plurality of pairs is preferable for backup or reserve capacity in case of damage or other caused inoperativeness. The pairs can be arranged in numerous patterns, as illustrated in FIGS. 3a through 3c, where light is reflected from one fiber to another of a pair as indicated by the dashed lines. The optical path between mating pairs of optical fibers should cover at least a portion of the nose periphery to accommodate targets approach at an oblique angle.

Furthermore, it may be desired to deploy the optical fiber pairs to have different standoff distances.

In much the same manner the principle of optical proximity detection is applicable to claws of robotic arms for detecting objects which are about to be grasped. As illustrated in FIG. 1, optical fiber pairs provide proximity detection for robotic arm claws. Optical fibers 114 and 116 have their first ends terminated substantially flush with the claw structure inner surface used for grasping an object. Optical fiber 114 has its other end connected with a source of light and transports that light to its first end where it is emitted as a cone of light between the claw pairs. Optical fiber 116, defined as the receiving fiber, receives reflected light at its one end and transports that light to its other end and coupled to a light detector where it is converted into a first electrical signal and processed in a manner disclosed with reference to FIG. 5. An object (not illustrated) about t be grasped by the claws when approaching within close proximity to the claw surface comes within a standoff distance (d) at which time a command signal functions to allow the gripper or claw to grasp the object without crushing it. As with the torpedo nose, the optical fiber ends which terminate adjacent the claw structure surface can be spaced or provided with cones of acceptance sufficient to control the standoff distance (d) to which an object will be closed. In a similar manner, the nose of the robot arm claw is provided with a forward looking detector. This detector likewise comprises a pair of optical fibers 214 (transmitting) and 216 (receiving) each terminating in first ends in the nose structure surface of the claw to look in a forward parallel direction with their cones of acceptance overlapping to define common volume and are disposed to operate at standoff distance (e), as described with reference to the claw gripper or torpedo nose. The other end of optical end fiber 214 is provided with a light source to illuminate an object being approached by the gripper claw. Light reflected from the object is receieved through the one end of the receiving optical fiber 216 and transported to a light detector where it is processed to provide a control signal to let the gripper claw to approach no closer to the object than a predetermined distance. The optical arrangement performs substantially in much the same manner to issue a control signal whether used on a torpedo nose or on a robotic gripper claw.

There has been described an invention for optically detecting the presence of an object in close proximity to a structure surface and processing a generated optical signal to issue a control or command electrical signal to accomplish a desire function. It will be obvious to those skilled in the art that numerous changes and variations may be made thereto without departing from the spirit of the invention which is limited only by the scope of the claims annexed hereto.

What is claimed is:

1. A proximity detector for detecting an object at a predetermined distance in front of a structure surface comprising:

a pair of optical fibers each terminating in laterally spaced-apart first ends facing in the same optical direction and having cones of acceptance which partially overlap in front of the structure surface to define a common volume;

one of the pair of optical fibers coupled with a light source at its other end to emit that light from its one end to illuminate objects coming within its cone of acceptance;

the other of the pair of optical fibers adapted to receive in its first end light reflected from illuminated objects coming within the common volume of the cones of acceptance and transport that light to its other end;

photodetector means receiving reflected light emitted from the optical fiber other end;

said photodetector means converting that light to a first electrical signal; and means processing the first electrical signal to generate a second signal only after the first electrical signal has decreased to around 30% of its peak level;

whereby the second signal defines a control signal only after an object has come in closer proximity to the structure surface than where reflected light from the common volume was at its maximum.

2. The invention according to claim 1 further defined by the structure surface being the surface of a robotic grasping claw.

3. The invention according to claim 1 further defined by the structure surface being the nose surface of a torpedo.

4. The invention according to claim 2 further defined by the optical fiber first ends terminating substantially adjacent the structure surface of the robotic grasping claw.

5. The invention according to claim 3 further defined by the optical fiber first ends terminating substantially adjacent the structure surface defining the forward nose surface of a torpedo.

6. A proximity detector for use on a torpedo for detecting the surface of an underwater object being approached by the torpedo nose, comprising:
   at least one pair of optical fibers having first ends terminating adjacent the nose surface and facing optically forward thereof;
   said optical fiber first ends spaced apart a selected lateral distance so that their cones of acceptance mutually overlap commencing a short distance in front of the nose surface to define a common volume;
   one of the optical fibers coupled with a light source for emitting light from its first end for illuminating the surface of an underwater object ahead of the torpedo in its cone of acceptance;
   the other of the optical fibers adapted to receive in its cone of acceptance light reflected from the surface of the underwater object coming within the common volume of the cones of acceptance and transport that light to its other end;
   means detecting the transported reflected light at the fiber end and converting it to a responsive first electrical signal; and,
   means processing the first electrical signal and providing a second electrical signal only after the first electrical signal has decreased to approximately 30% of its peak level;
   whereby the second electrical signal defines a signal for firing a warhead aboard the torpedo only after the approached object surface has become closer to the torpedo nose surface than in the common volume where maximum light reflection is received.

7. The invention according to claim 6 further defined by the first ends of the optical fiber pair terminating substantially flush with the torpedo nose surface.

8. The invention according to claim 7 further defined by a plurality of pairs of optical fibers disposed about the torpedo nose.

9. The invention according to claim 8 further defined by optical fiber pairs having their ends spaced apart different distances thereby controlling the short distance to the cones of acceptance common volume.

10. The invention according to claim 8 further defined by different optical fiber pairs having different cones of acceptance.

11. A method of detecting the presence of an object in close proximity in front of a structure surface comprising the steps of:
    emitting a cone of light in front of the structure surface for illuminating any object coming within its field;
    receiving light reflected from the illuminated object along a cone of acceptance which partially overlaps with the cone of emitted light commencing shortly in front of the structure surface to define a common volume;
    generating a first electrical signal responsive to the magnitude of light reflected from an object coming within the field of the common volume; wherein said first electrical signal increases to a peak level as the object approaches into the common volume and decreases as the object departs the common volume; and,
    processing the first electrical signal to provide a second electrical signal only after the first electrical signal has decreased to substantially below its peak level.

* * * * *